United States Patent
Kang et al.

(10) Patent No.: US 8,180,340 B2
(45) Date of Patent: May 15, 2012

(54) METHOD FOR SAVING FILES IN MOBILE COMMUNICATION TERMINAL

(75) Inventors: Chang Taek Kang, Gumi-si (KR); Kwang Taek Woo, Daegu Metropolitan (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 855 days.

(21) Appl. No.: 12/009,407

(22) Filed: Jan. 18, 2008

(65) Prior Publication Data

US 2008/0207199 A1   Aug. 28, 2008

(30) Foreign Application Priority Data

Feb. 28, 2007   (KR) .................. 10-2007-0020097

(51) Int. Cl.
*H04W 24/00* (2009.01)
(52) U.S. Cl. ............... 455/425; 455/186.1; 455/418; 379/88.28
(58) Field of Classification Search .............. 455/425
See application file for complete search history.

(56) References Cited

U.S. PATENT DOCUMENTS

| | | | |
|---|---|---|---|
| 6,829,006 B1* | 12/2004 | Hayashi | 348/231.2 |
| 7,278,583 B2* | 10/2007 | Lee | 235/492 |
| 7,359,732 B2* | 4/2008 | Kim et al. | 455/558 |
| 7,634,297 B2* | 12/2009 | Sin | 455/558 |
| 2004/0212735 A1* | 10/2004 | Kitamura | 348/553 |
| 2006/0064638 A1* | 3/2006 | Bocking | 715/700 |
| 2009/0315667 A1* | 12/2009 | Kawamura et al. | 340/3.1 |

FOREIGN PATENT DOCUMENTS

| | | |
|---|---|---|
| JP | 6-233225 A | 8/1994 |
| JP | 9-98367 A | 4/1997 |
| JP | 10-177646 A | 6/1998 |
| JP | 2003-150929 A | 5/2003 |
| JP | 2005-123849 A | 5/2005 |
| JP | 2005-136654 A | 5/2005 |
| JP | 2006-011971 A | 1/2006 |
| KR | 2004-9097 | 1/2004 |

* cited by examiner

*Primary Examiner* — Nick Corsaro
*Assistant Examiner* — Isaak R Jama
(74) *Attorney, Agent, or Firm* — Cha & Reiter, LLC

(57) ABSTRACT

A method for saving files in a mobile communication terminal includes: if an externally pluggable memory is detected, determining whether a count corresponding to the memory is present in the mobile communication terminal; if a count corresponding to the memory is present, checking whether a file save command is input in the memory; and if a file save command is input, increasing the count, and saving the count and the files in the memory. The files can be saved based on folders in the memory, thereby enhancing the file save speed. Each memory has a count, thereby making it easy to ascertain the number of saved files.

17 Claims, 6 Drawing Sheets

FIG. 7
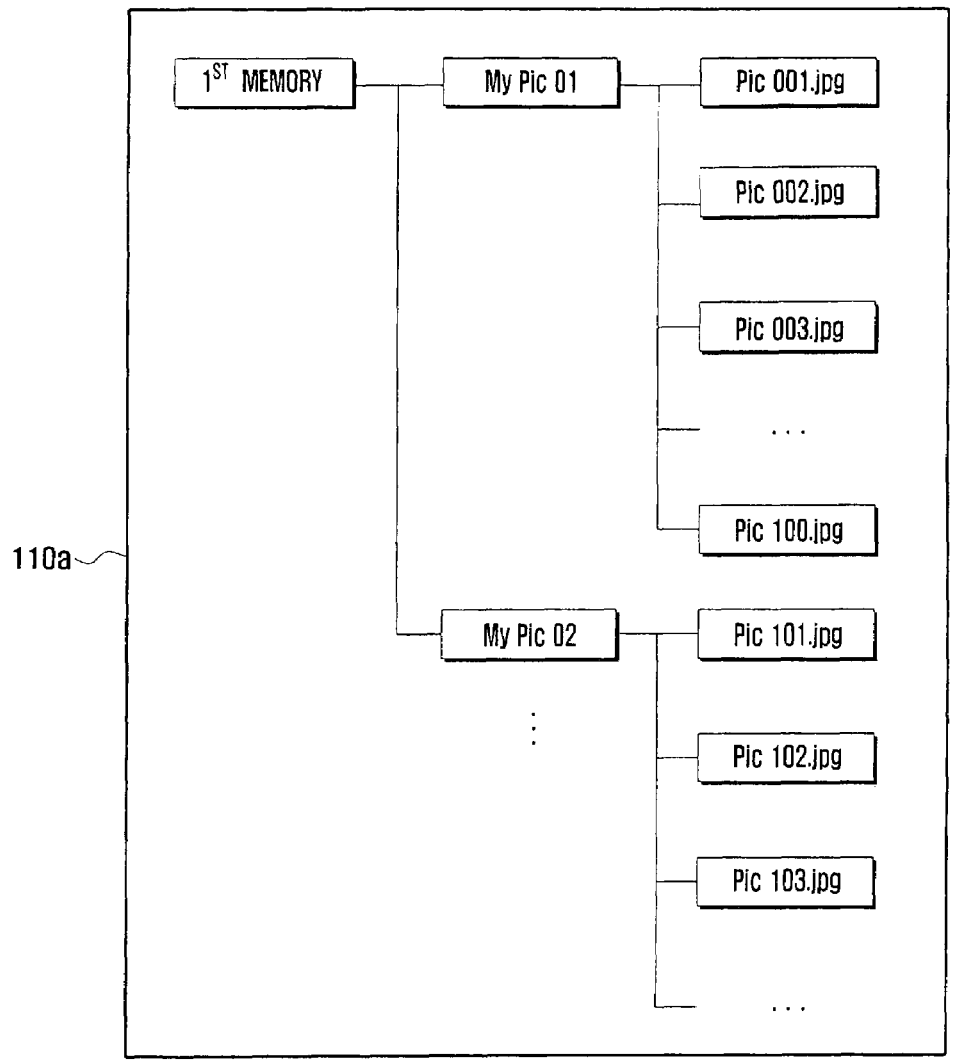
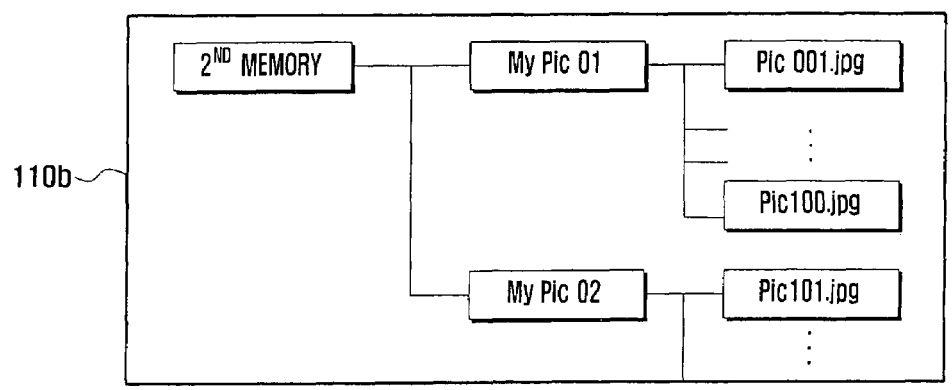

METHOD FOR SAVING FILES IN MOBILE COMMUNICATION TERMINAL

CLAIM OF PRIORITY

This application claims priority under 35 U.S.C. §119 from an application entitled "METHOD FOR SAVING FILES IN MOBILE COMMUNICATION TERMINAL," filed in the Korean Intellectual Property Office on Feb. 28, 2007 and assigned Serial No. 2007-0020097, the contents of which are incorporated herein by reference in its entirety.

BACKGROUND OF THE INVENTION

1. Field of the Invention

The present invention relates to file saving technology. More particularly, the present invention relates to a method for saving files and file management in a memory inserted into a device such as a mobile communication terminal.

2. Description of the Related Art

Mobile communication terminals include devices such as: personal digital assistants (PDA's), cellular phones, personal communication service (PCS) phones, hand-held PC's, global system for mobile communication (GSM) phones, laptop computers, MP3 players, and portable multimedia players (PMP's), etc. just to name a few of such devices.

Due to the recent widespread use of mobile communication terminals, many mobile communication terminal users prefer terminals that offer a variety of functions beyond basic communication features. To comply with users' wishes, terminal manufacturers have included additional functions in mobile communication terminals to enhance the standard function. For example, mobile communication terminals are manufactured to include features such as a camera and a mobile disc.

The camera installed in a mobile communication terminal facilitates taking and storing photographs with the added advantage of not having to carry a separate camera. That is, the mobile communication terminal stores files of the images captured by the user.

Terminal users can store many types of data, including moving image files, still image files, audio files, and text files. In addition, mobile communication terminals permit the users the opportunity to view the stored data as often as desired when the users are out and about.

However, since mobile communication terminals have a limited memory capacity, only a set amount of data or pictures can be stored. To resolve the problem of limited memory capacity, an additional memory, typically in the form of a module, must be purchased in order to store a large amount of data therein.

However, when a user inserts the additional memory into the mobile communication terminal and saves files, the mobile communication terminal checks all previously saved files (typically in all of the memory) to check whether any of them have the same file name as the current file(s) about to be saved. If there is no file with the same name, the mobile communication terminal saves the current file(s) in the memory. If a plurality of files is saved, the mobile communication terminal must check the files one at a time, which causes a delay before the current files are saved. Users do not like to spend time waiting for the mobile communication terminal to check all the files, and are typically unable to use the terminal to take other photographs (if the opportunity should arise) or use other features of the mobile communication terminal while waiting during this delay for file checking.

In an attempt to bypass the aforementioned problem of a delay during file checking, some users manually create a plurality of folders in the memory (often prior to taking photographs) and then save their pictures in the corresponding folders. Therefore, the conventional method, which is essentially a bypass of the known problem of delay, has disadvantages such that, for example, users must spend time creating folders.

Also, if a user wishes to store a large amount of data, the user must manipulate a plurality of memories in such a way that: the user inserts a first memory into the mobile communication terminal and then takes photographic images; the images are saved in the inserted first memory; the first memory is separated from the mobile communication terminal; and the user then inserts the second memory into the mobile communication terminal and takes photos to save them therein. Here, the pictures are saved in the second memory as serial file names that are followed by the serial file names of the pictures saved in the first memory. Therefore, there is a great degree of difficulty for the user to read how many pictures are saved in a corresponding memory.

SUMMARY OF THE INVENTION

The present invention solves in part at least some of the above-mentioned problems and provides advantages such as those discussed herein below. The present invention provides a method for saving files in a memory of a mobile communication terminal.

In addition, the present invention also provides a method for managing files by allocating a unique counter to the memory of a mobile communication terminal.

In accordance with an exemplary embodiment of the present invention, a method for saving files in a mobile communication terminal typically includes: if a memory is inserted, determining whether a count corresponding to the memory exists (i.e. present) in the mobile communication terminal; if a count corresponding to the memory exists, checking whether a file save command is input in the memory; and if a file save command is input, increasing the count, and saving the count and the files in the memory.

BRIEF DESCRIPTION OF THE DRAWINGS

The above features, and advantages of the present invention will become more apparent from the following detailed description in conjunction with the accompanying drawings, in which:

FIG. 7 is a view illustrating a hierarchical file structure of files saved in a memory according to an exemplary embodiment of the present invention.

DETAILED DESCRIPTION

Hereinafter, exemplary embodiments of the present invention are described in detail with reference to the accompanying drawings. The same reference numbers are used throughout the drawings to refer to the same or similar parts. For the purposes of clarity and simplicity, detailed descriptions of well-known functions and structures incorporated herein may be omitted to avoid obscuring appreciation of the subject matter of the present invention by a person of ordinary skill in the art.

Prior to explaining the exemplary embodiments of the present invention, relevant terminologies will be defined for the present description below:

1. Identification information: refers to a unique identification number allocated to each memory. The identification information is formed by an alphanumeric combination, for example, 'M1.'

2. Count: refers to the number of files saved in a memory. The count increases when a file is saved.

Figure 1:
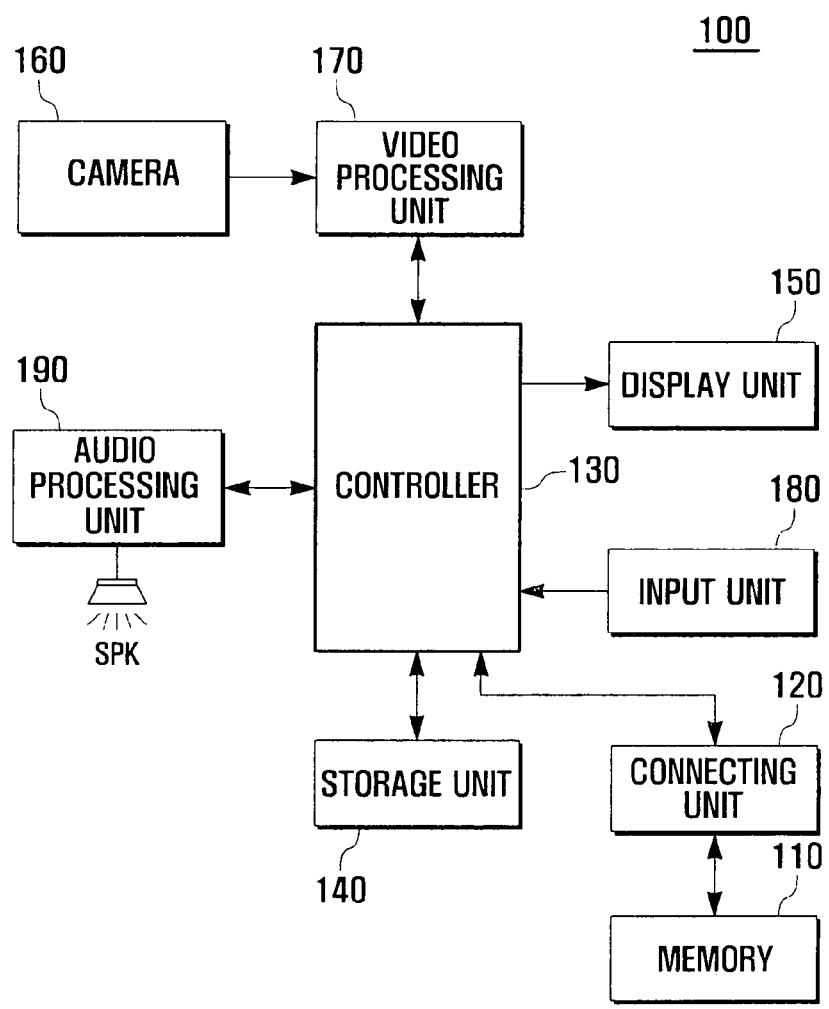
FIG. 1 is a schematic block diagram illustrating a mobile communication terminal that saves files according to the file saving method in accordance with an exemplary embodiment of the present invention.

The following text describes a mobile communication terminal that can operate a file save method according to the present invention with reference to FIG. 1.

The memory 110 stores memory identification information and a plurality of saved files. If the memory 110 does not have a count that corresponds to the identification information, it stores the count allocated under the control of the controller 130. The files include, for example, moving image files, still image files, and audio files.

The connecting unit 120 serves to connect the memory 110 to the mobile communication terminal 100. For example, the connecting unit 120 detects insertion and separation between the memory 110 and the mobile communication terminal 100. The connecting unit 120 transmits data stored in the inserted memory 110 to the controller 130. For instance, the connecting unit 120 transmits identification information about the inserted memory 110 to the controller 130. Also, if the inserted memory 110 has a counter, the connecting unit 120 may transmit the count, as well as the identification information, to the controller 130.

Still referring to FIG. 1, the controller 130 controls the entire operation of the mobile communication terminal 100 and also controls the memory 110 through the connecting unit 120. In particular, when the connecting unit 120 detects the insertion of the memory 110, the controller 130 inputs the identification information about the memory 110 and checks whether the input identification information is stored in the storage unit 140. If the storage unit 140 does not store the input identification information, the controller 130 will determine whether a count exists in the memory 110. If the count is stored in memory 110, the controller 130 inputs the count and the identification information about the inserted memory 110 through the connecting unit 120, and then stores them in the storage unit 140. On the contrary, if the inserted memory 110 does not store the count, the controller 130 registers the identification information about the inserted memory 110 in the storage unit 140, and then allocates a count corresponding to the identification information so as to initialize the count. After that, the controller 130 outputs the count, initialized by the connecting unit 120, and a signal for creating a folder for saving files, to the memory 110.

If the storage unit 140 stores the input identification information about the memory 110, the controller 130 determines whether a file save command is input. If the file save command has been input, the controller 130 saves a corresponding file in the inserted memory 110. Specifically, for example, the controller 130 compares the count of the inserted memory 110 with the setting value stored in the storage unit 140. Here, the setting value is the number of 'n' times, in which 'n' represents the number of files that can be saved in one folder. The 'n' value can be set to an initial default when the mobile communication terminal is manufactured and may be altered through the user's preference information. For example, if n=100, the setting value is increments of 100, such as 100, 200, 300, and so on. If the count is identical to the setting value, the controller 130 outputs a command for creating a folder (hereinafter referred to as a folder creating command) to the inserted memory 110 through the connecting unit 120.

After outputting the command for creating the folding, the controller 130 increases the count by an increment and then stores a corresponding file in the inserted memory 110. The name of the corresponding file is set to correspond to the increased count, and preferably, is set so as to be identical to the increased count. Here, it is preferable for the increment to be set to one.

If the memory 110 is separated from the mobile communication terminal, the controller 130 is unable to control the memory 110 when during the separation. That is, the controller 130 does not input information about the memory 110 through the connecting unit 120.

Still referring to FIG. 1, the storage unit 140 stores programs for operating the mobile communication terminal 100. The storage unit 140 stores a count and identification information output from the memory 110 under the control of the controller 130. The storage unit 140 stores a memory management table for managing the inserted memory 110, an example of which is described below in Table 1.

TABLE 1

| Memory Identification information (21) | Count (23) |
|---|---|
| M1 | 140 |
| M2 | 101 |
| M3 | 50 |

As described in Table 1, the memory management table is includes fields of memory identification information (21) and a corresponding count (23). For example, if a memory 110 has memory identification information (21) of 'M1,' its count (23) is '140.'

The display unit 150 displays the states and operational processes of the mobile communication terminal 100. The display unit 150 displays display data that is output from the input unit 180 under the control of the controller 130. The display unit 150 displays a variety of information related to the operation states of the mobile communication terminal 100 in various forms including: text form, image form, animation form, and icons. In particular, the display unit 150 displays images captured through the camera 160.

The camera 160 captures images. To this end, the camera 160 includes a camera sensor that converts an optical signal of a captured image into an electrical signal. The camera 160 converts captured image data into video data and outputs the video data to the video processing unit 170.

The video processing unit 170 processes the video data from the camera 160 to generate screen data for display typically by the display unit. To this end, the video processing unit 170 compresses and extends the video data to comply with the standard of the display unit 150 and then outputs it to the display unit 150 under the control of the controller 130.

The input unit 180 is an input device designed to interface with users to operate various functions of the communication terminal, and is implemented with various types of input devices, such as a keypad, and a touch screen. The input unit 150 permits a user to input operational signals from a user and then outputs the operational signals to the controller 130. In particular, the input unit 180 allows the input of commands such as file save commands, based on the user's preference information, and outputs them to the controller 130.

The audio processing unit 190 processes audio data from an audio file and plays back audio signals through a speaker SPK. For example, if a playback command is input to command the play back of an audio file stored in the memory 110, the audio processing unit 190 processes audio data from the audio file and plays back audio signals corresponding to the processed audio data through the speaker SPK.

Figure 2:
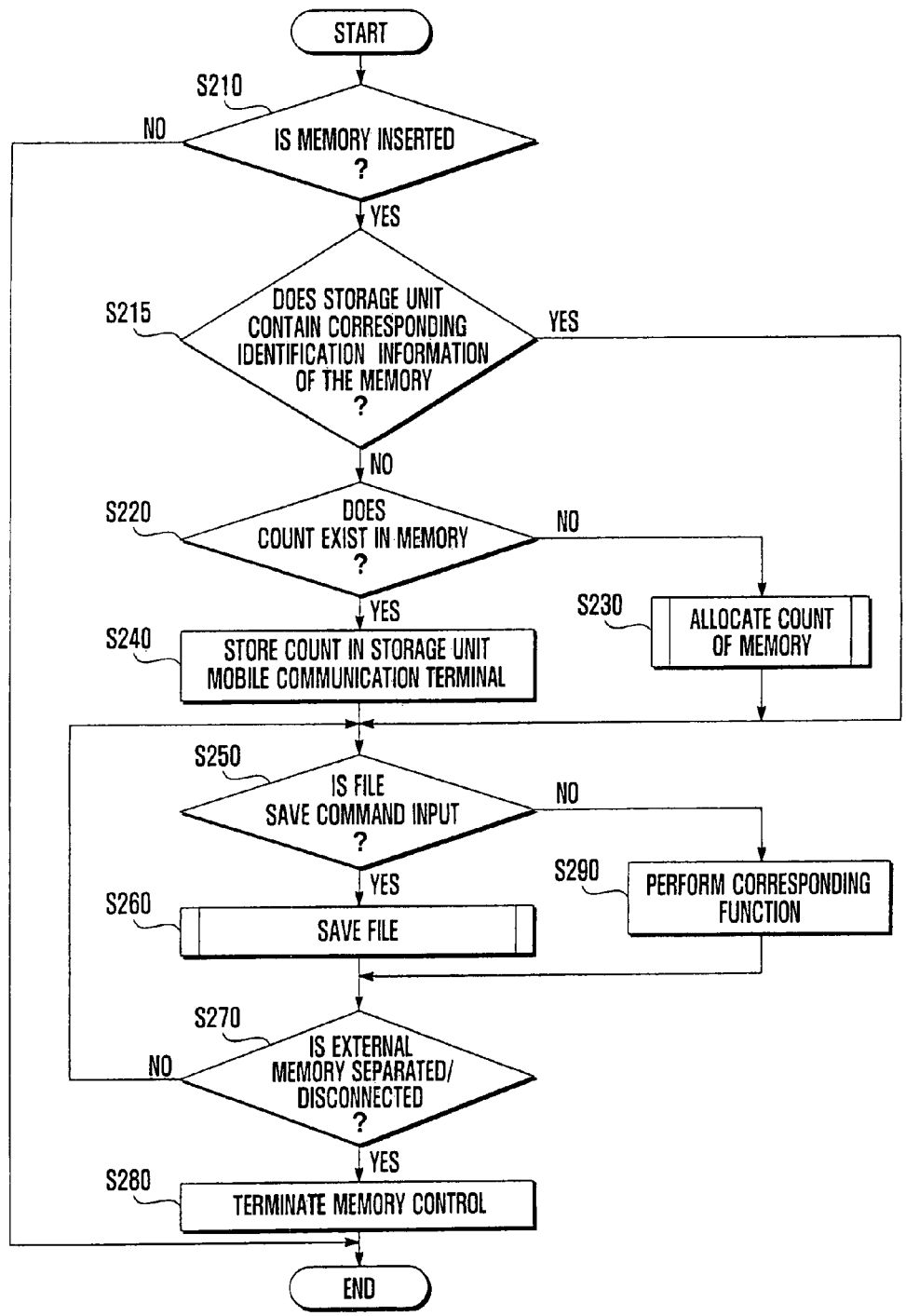
FIG. 2 is a flow chart illustrating a method for saving files in a mobile communication terminal, according to an exemplary embodiment of the present invention.
Figure 3:
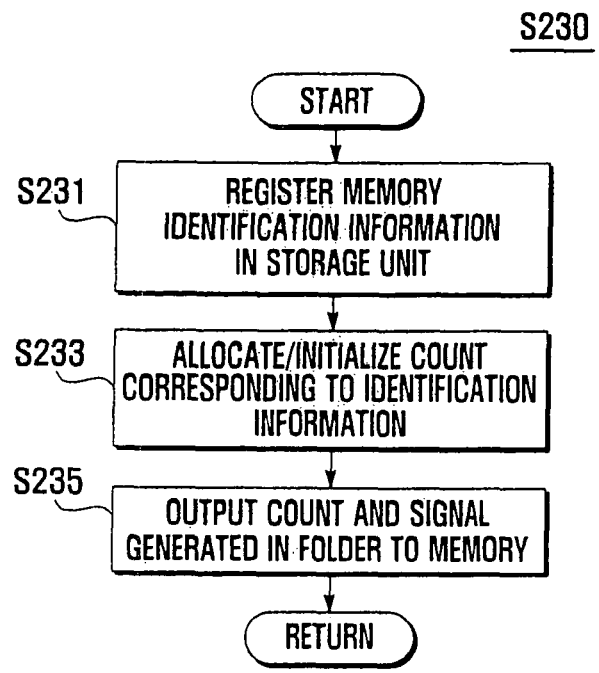
FIG. 3 is a flow chart illustrating a process where counter is allocated to the memory of FIG. 2.
Figure 4:
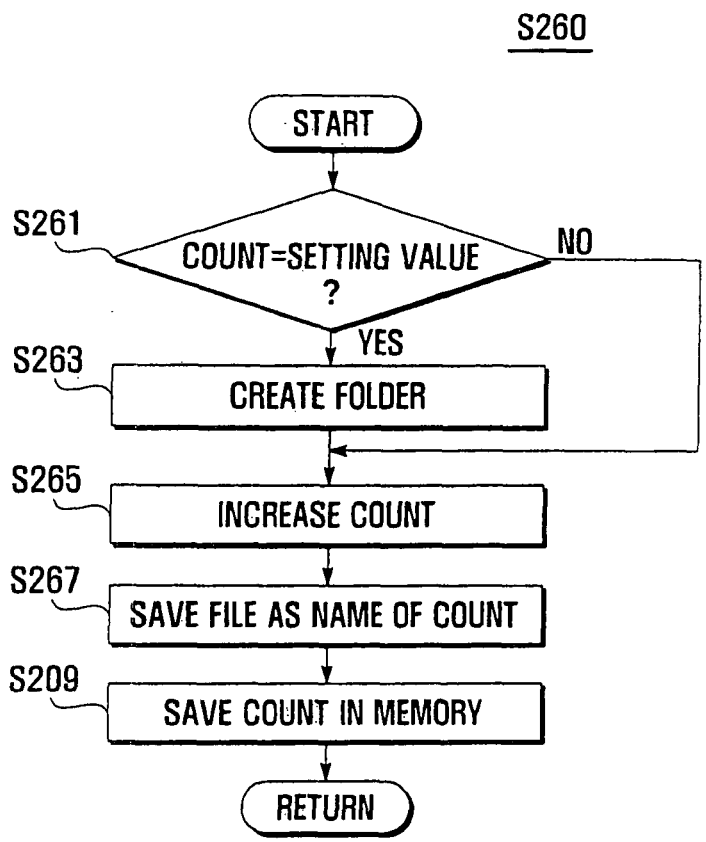
FIG. 4 is a flow chart illustrating a process where files are saved in the memory of FIG. 2.

FIG. 2 is a flow chart illustrating one example of a method for saving files in a mobile communication terminal, according to one embodiment of the present invention. FIG. 3 is a flow chart illustrating an example of a process where the count is allocated to the memory of FIG. 2. FIG. 4 is a flow chart illustrating an example of a process where files are saved in the memory of FIG. 2.

Referring now to FIGS. 1 and 2, the controller 130 controls the connecting unit 120 in order to detect whether the memory 110 has been inserted to the mobile communication terminal (S210). If the controller 110 detects the insertion of the memory 110, the controller obtains identification information about the memory 110 through the connecting unit 120 and checks whether the obtained identification information is stored in the storage unit 140 (S215). If the storage unit 140 does not store the identification information, the controller 130 checks whether a count exists in the inserted memory 110 (S220). If the inserted memory 110 does not have a count, the controller 130 allocates a count to the inserted memory 110 (S230). Allocating a count to the memory 110 will be described in detail with reference to FIG. 3.

Referring to FIG. 3, the controller 130 stores the identification information about the memory 110 in the storage unit 140 (S231). The controller 130 then allocates a count corresponding to the identification information to initialize the count (S233). It is preferable that the count is set to 'zero' through the initialization. Subsequently, the controller 130 outputs the initialized count and a folder creating signal for creating a folder for saving files to the memory 110 through the connecting unit 120 (S235).

Referring to FIG. 2 again, if the inserted memory 110 has a count at step S220, the controller 130 stores the count and the identification information about the inserted memory 110 in the storage unit 140 (S240). The controller 130 then checks whether a file save command for saving a specific file in the inserted memory 110 is input (S250). If a file save command is input, the controller 130 saves a corresponding file in the memory 110 (S260), which will be described in detail in the following explanation of FIG. 4.

As shown in FIG. 4, the controller 130 determines whether the count of the inserted memory 110 is identical to a setting value (S261). Here, the setting value is the number of 'n' times, in which 'n' represent the number of files that can be saved in one folder. The 'n' value can be set when the mobile communication terminal is manufactured and may be altered through the user's preference information. For example, if n=100, the setting value is in increments of 100, such as 100, 200, 300, and so on.

Still referring to FIG. 4, if the count of the inserted memory 100 is identical to the setting value, the controller 130 creates a folder for saving and managing files (S263). Subsequently, the controller 130 typically increases the count of the memory 110 by incrementing the count which is currently saved in the storage unit 140 (S265). Here, it is preferable that the increment is one. The controller 130 sets a file name using the increased count and then saves the file in the memory 110 (S267). The controller 130 saves then the increased count in the memory 110 (S269).

Referring to FIG. 2 again, the controller 130 controls the connecting unit 120 in order to detect whether the memory 110 is separated from the mobile communication terminal (S270). If the controller 130 detects the separation of the memory 110, it stops controlling the memory 110 (S280).

However, if the file save command is not input at step S250, the controller 130 performs a corresponding function (S290), which may include but is not limited to file selection, file deletion, etc.

For example, the controller 130 may check whether a file selection command is input. If a file selection command is input, the controller 130 reads the location where the corresponding file is saved, and then checks whether a file delete command is input. In the case where a file delete command is input, the controller 130 deletes the corresponding file. After deleting the corresponding file, the controller 130 detects whether the memory 110 is separated from the mobile communication terminal at step S270. If the controller 130 detects the separation of the memory 110, it stops controlling the memory 110 at step S280.

After selecting a file, the controller 130 determines whether a file movement command is input. If the controller 130 detects the input of a file movement command, it moves a corresponding file. Specifically, when a file movement command is input, the controller 130 displays one or more folders saved in the memory 110 in a list. After displaying the list of folders, the controller 130 checks whether a selection command is input to select a specific folder displayed in the list. If a selection command for the specific folder is input, the controller 130 moves the selected file to the selected folder. The controller 130 then detects whether the memory 110 is separated from the mobile communication terminal at S270. If the controller 130 detects the separation of the memory 110, the memory control function terminates at step S280.

Figure 5:
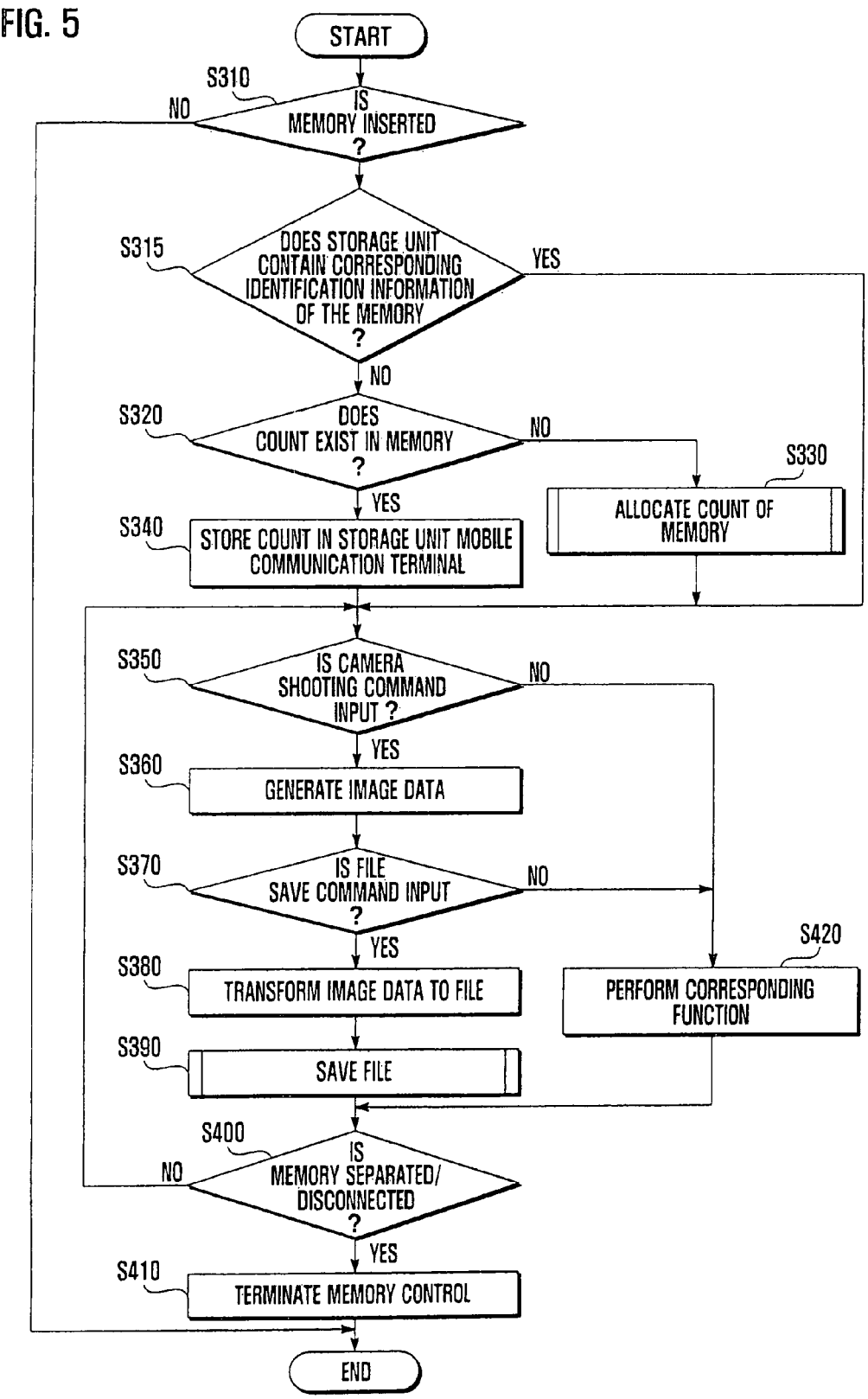
FIG. 5 is a flow chart illustrating a method for saving files in a mobile communication terminal, according to another exemplary embodiment of the present invention.

FIG. 5 is a flow chart illustrating an example of a method for saving files in a mobile communication terminal, according to another exemplary embodiment of the present invention, in which the mobile communication terminal includes a camera.

Referring to FIGS. 1 and 5, the controller 130 controls the connecting unit 120 to detect whether the memory 110 is inserted to the mobile communication terminal (S310). If the controller 130 detects the insertion of the memory 110, the controller then obtains identification information about the memory 110 through the connecting unit 120 and checks whether the obtained identification information is stored in the storage unit 140 (S315). If the storage unit 140 does not store the identification information, the controller 130 checks whether a count exists in the inserted memory 110 (S320).

At step (S330), if the inserted memory 10 does not have a count, the controller 130 allocates a count to the inserted memory 110. Since allocating a count to the memory 110 has been already described with reference to FIG. 3, a detailed description of this process will be omitted below.

However, if at step S320 the controller 130 determines the inserted memory 110 has a count, the controller 130 controls the connecting unit 120 to store the count and the identification information about the memory 110 in the storage unit 140 (S340). After storing the count and identification information about the memory 110 in the storage unit 140, the controller 130 checks whether a camera shooting command according to the user's preference information is input (S350).

Still referring to FIGS. 1 and 5, at step S360 if a camera shooting command is input at step S350, the controller 130 outputs video data from the camera 160 to the video processing unit 170 to generate image data. The controller 130 then determines whether a file save command is input (S370). If a file save command is input, the controller 130 converts the image data into a file (S380). After that, the controller 130 saves the file in the memory 110 (S390). Since saving a file in the memory 110 has been already described with reference to FIG. 4, a detailed description of this process will be omitted below.

After saving the file, the controller 130 controls the connecting unit 120 to detect then whether the memory 110 is separated from the mobile communication terminal (S400). At step S410, if the controller 130 detects the separation of the memory 110 from the mobile communication terminal, the memory control function is terminated as it no longer controls the memory 110 once it has been separated from the mobile communication terminal.

However, if at step S350a camera shooting command is not input by the user, or if at step S370 a file saving command is not input by the user, the controller 130 performs a corresponding function (S420).

Figure 6:
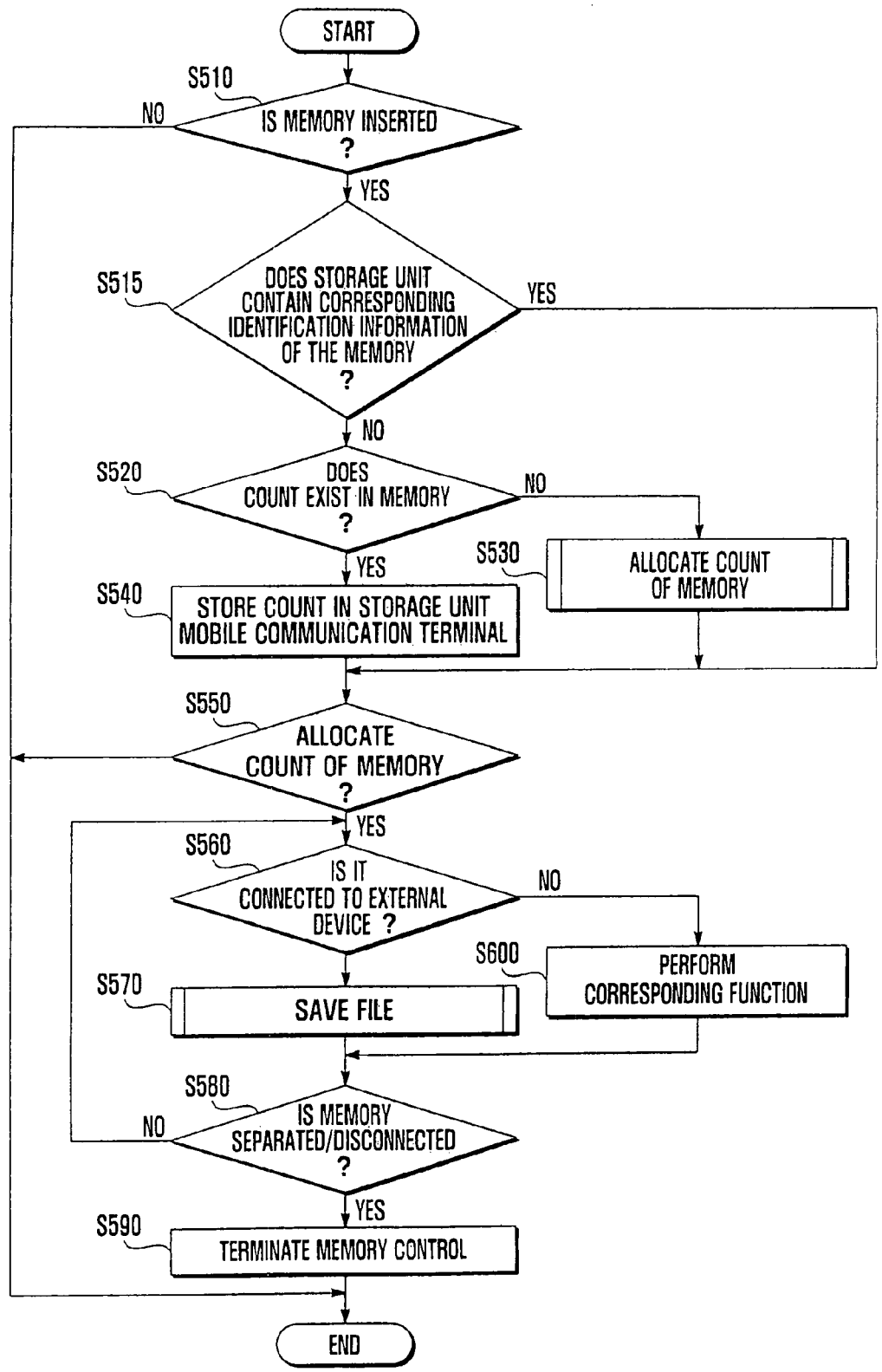
FIG. 6 is a flow chart illustrating a method for saving files in a mobile communication terminal, according to another exemplary embodiment of the present invention.

FIG. 6 is a flow chart illustrating an example of a method for saving files in a mobile communication terminal according to another exemplary embodiment of the present invention.

Referring to FIGS. 1 and 6, the controller 130 controls the connecting unit 120 to detect whether the memory 110 is inserted to the mobile communication terminal (S510). If the controller 110 detects the insertion of the memory 110, the controller 130 obtains identification information about the memory 110 through the connecting unit 120 and checks whether the obtained identification information is stored in the storage unit 140 (S515). If the storage unit 140 does not have the identification information stored therein, the controller 130 checks whether a count exists in the inserted memory 110 (S520). If the inserted memory 110 does not have a count, the controller 130 allocates a count to the inserted memory 110 (S530). Since allocating a count to the memory 110 has been already described with reference to FIG. 3, its detailed description will be omitted below.

However, if at step 520 the controller 130 determines that the inserted memory 110 has a count at step S520, the controller 130 controls the connecting unit 120 to store the count and the identification information about the memory 110 in the storage unit 140 (S540). Subsequent to step S540, the controller 130 checks whether the mobile communication terminal is connected to any external devices (e.g. a server or a computer and/or peripheral such as a printer, appliance, etc. or another mobile communication terminal) (S550). If the mobile communication terminal is connected to an external device, the controller 130 determines whether the mobile communication terminal requests the download of a specific file from the external device (S560). Here, the connection of the mobile communication terminal to the external device includes a wireless connection, in particular another mobile communication terminal, through short-range wireless communication (some non-limiting examples include, Bluetooth communication, Zigbee communication, Visible Light Communication (VLC) and infrared communication) or a wired cable.

If downloading a specific file is requested at step S560, the controller 130 downloads the specific file and saves it in the memory 110 (S570). Since saving a file in the memory 110 has been already described with reference to FIG. 4, a detailed description of this process will be omitted below.

After saving the file at step S370, the controller 130 controls the connecting unit 120 to then detect whether the memory 110 is separated from the mobile communication terminal (S580). If the controller 130 detects the separation of the memory 110 from the mobile communication terminal, it stops controlling the memory 110 (S590).

However, at S560, if downloading a specific file is not requested, the controller 130 then performs a corresponding function (S600).

FIG. 7 is a view illustrating a hierarchical file structure of files saved in a memory according to an exemplary embodiment of the present invention which is being provided solely for illustrative purposes and not to limit the present invention.

As indicated in FIG. 7 by 110a, the first memory has two folders, each of which saves files whose file names correspond to counts. Specifically, the first folder 'MyPic01' saves 100 image files (Pic 001, Pic 002, . . . , Pic 100) that correspond to counts 1 to 100, and the second folder 'MyPic02' saves a plurality of image files whose file names are named starting from count Pic 101, Pic 102, and so on, i.e., continuing the serial number of the file names in the first folder.

Also, as indicated in FIG. 7 by 110b, the second memory has two folders, each of which saves files whose file names correspond to counts.

As describe above, the memories 110a and 110b have their respective counters, which may be identical to each other.

When a mobile communication terminal in accordance with the present invention inputs a file save command, the controller determines whether the number of current folders is a setting value. If the number of current folders is a setting value, the controller creates a new folder to save files.

Therefore, the method for saving files, according to the present invention, does not check all saved files, but only files saved in the folder in order to save files in the memory, thereby reducing the time required to save files. Also, although a user employs a plurality of memories, the user can utilize the unique counters that are allocated to the plurality of memories. In addition, the user can easily check the number of files saved in the memory inserted into the mobile communication terminal.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the invention as defined in the appended claims. For example, while in the present invention, in the examples discussed herein above, the controller 130 checks whether the memory 110 has been separated from the mobile communication terminal, the separation may not be a physical separation and could be that the memory device or turned off, or otherwise locked or inaccessible, for example, for security purposes. Thus, an inserted memory may include powering on or otherwise rendering the memory accessible to the mobile communication terminal. Additionally, the connection to the memory 110 can be a wireless connection.

What is claimed is:

1. A method for saving files, comprising:
   (a) upon detecting a presence of an externally pluggable memory, saving memory identification information of the memory in a memory management table provided in a storage unit of the terminal and determining whether a count corresponding to the memory is present in the terminal;

(b) checking whether the memory has a file save command therein when the count corresponding to the memory is present; and (c) saving one or more files associated with the count in the memory when the file save command is input in the memory, wherein the count indicates the number of total files currently saved in the memory;

(d) creating a new folder in the memory when the increased count is identical to a setting value, and (e) increasing the count corresponding to the memory and saving the increased count persistently in the memory management table of the terminal so as to correspond to the memory identification information in the memory management table.

2. The method of claim 1, wherein the determining whether the count corresponding to the memory is present in the mobile communication terminal in step (a) includes checking the storage unit in the terminal.

3. The method of claim 1, further comprising:
wherein in step (a) when the count corresponding to the memory is not present in the terminal, determining whether the count is present in the memory; and
storing the count and identification information about the memory in the terminal if the count is present in the memory.

4. The method of claim 1, further comprising:
wherein in step (a) when the count corresponding to the memory is not present in the terminal, determining whether the count is present in the memory; and
allocating the count corresponding to identification information about the memory to initialize the count if the count is not present in the memory.

5. The method of claim 4, further comprising:
creating folders in the memory when allocating the count.

6. The method of claim 5, wherein the one or more files comprises a plurality of files and saving the count and the files in the memory comprises:

(i) setting the names of the files to correspond to the count; and (ii) saving the files as the set file names from (i) in the memory.

7. The method of claim 1, wherein the one or more files comprises a plurality of files and saving the count and the files in the memory comprises:

(i) setting the names of the files to correspond to the count; and (ii) saving the files as the set file names from (i) in the memory.

8. The method of claim 6,
if the count is identical to a setting value when the files are saved,
setting the names of the files based on the increased counts, and saving the files as the set file names in the created folder.

9. The method of claim 8, wherein the setting value is represented as a number of 'n' times.

10. The method of claim 9, wherein 'n' is the number of files that can be saved in the folder.

11. The method of claim 10, wherein the files comprise either still image files, moving image files, video data, or audio files.

12. The method of claim 10, wherein the files comprise at least one or more of still image files, moving image files, video data or audio files.

13. The method of claim 11, wherein saving the count and the files in the memory comprises:
creating a file for the video data when the file save command is received for saving the video data that is generated by a camera of the terminal.

14. The method of claim 12, wherein saving the count and the files in the memory comprises:
increasing the count, and saving the count and the files in the memory if a file is requested to be downloaded from an external device.

15. The method of claim 12, wherein saving the count and the files in the memory comprises:
creating a file for still image data when the file save command is received for saving still image data is generated by a camera of the terminal.

16. The method of claim 12, wherein saving the increased count and the files in the memory comprises:
creating a file for moving image data when the file save command is received for saving moving image data is generated by a camera of the terminal.

17. The method of claim 12, wherein saving the increased count and the files in the memory comprises:
creating a file for audio data when the file save command is received for saving audio data is generated by the terminal.

* * * * *